United States Patent
Nakayama et al.

(10) Patent No.: US 10,577,282 B2
(45) Date of Patent: Mar. 3, 2020

(54) CEMENT COMPOSITION AND MANUFACTURING METHOD FOR CEMENT CURED BODY USING SAME

(71) Applicant: TAIHEIYO CEMENT CORPORATION, Tokyo (JP)

(72) Inventors: Risa Nakayama, Chiba (JP); Katsuya Kono, Chiba (JP); Katsuhiko Tada, Chiba (JP); Hiroaki Mori, Chiba (JP); Shingo Sugiyama, Chiba (JP); Shinpei Maehori, Chiba (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 0 days.

(21) Appl. No.: 16/423,498

(22) Filed: May 28, 2019

(65) Prior Publication Data

US 2019/0276363 A1     Sep. 12, 2019

Related U.S. Application Data

(63) Continuation of application No. 15/505,142, filed as application No. PCT/JP2015/073916 on Aug. 25, 2015, now Pat. No. 10,351,476.

(30) Foreign Application Priority Data

Aug. 25, 2014 (JP) .................................. 2014-170645
Feb. 24, 2015 (JP) .................................. 2015-034112
(Continued)

(51) Int. Cl.
*C04B 28/04* (2006.01)
*C04B 22/06* (2006.01)
(Continued)

(52) U.S. Cl.
CPC ................ *C04B 28/04* (2013.01); *B28B 1/14* (2013.01); *B28B 11/245* (2013.01); *C04B 7/02* (2013.01);
(Continued)

(58) Field of Classification Search
CPC ....... C04B 40/0286; C04B 7/02; C04B 28/04; C04B 40/0263; C04B 40/024; C04B 40/0245; C04B 40/0272; B28B 11/245
See application file for complete search history.

(56) References Cited

U.S. PATENT DOCUMENTS 6,277,189 B1 * 8/2001 Chugh .................. C04B 28/021
106/640
7,086,849 B1    8/2006 Tazawa et al.
(Continued)

FOREIGN PATENT DOCUMENTS

JP       2001-151542 A    6/2001
JP       2001151542 A  *  6/2001 ............. C04B 7/368
(Continued)

OTHER PUBLICATIONS

JP 2002-151542 A (Yamamoto) dated Jun. 5, 2001 (English language machine translation). [online] [retrieved Aug. 2, 2019]. Retrieved from: Espacenet. (Year: 2001).*
(Continued)

*Primary Examiner* — Erin Snelting
(74) *Attorney, Agent, or Firm* — Posz Law Group, PLC

(57) ABSTRACT

Provided is a cement composition that has high fluidity (for example, a 0-drop flow value of 200 mm or more) before curing and exhibits high compressive strength (for example, 320 N/mm$^2$ or more) after curing. The cement composition includes a cement, a silica fume having a BET specific surface area of from 10 m$^2$/g to 25 m$^2$/g, an inorganic powder having a 50% cumulative particle size of from 0.8

(Continued)

μm to 5 μm, a fine aggregate having a maximum particle size of 1.2 mm or less, a water reducing agent, an antifoaming agent, and water. The ratio of the cement is from 55 vol % to 65 vol %, the ratio of the silica fume is from 5 vol % to 25 vol %, and the ratio of the inorganic powder is from 15 vol % to 35 vol % in the total amount of 100 vol % of the cement, the silica fume, and the inorganic powder.

7 Claims, 1 Drawing Sheet

(30) Foreign Application Priority Data

| | | | |
|---|---|---|---|
| Mar. 23, 2015 | (JP) | ................................ | 2015-059989 |
| May 22, 2015 | (JP) | ................................ | 2015-104920 |
| May 22, 2015 | (JP) | ................................ | 2015-104984 |

(51) Int. Cl.

| | |
|---|---|
| *C04B 7/02* | (2006.01) |
| *C04B 14/38* | (2006.01) |
| *C04B 28/02* | (2006.01) |
| *C04B 18/02* | (2006.01) |
| *B28B 11/24* | (2006.01) |
| *C04B 14/04* | (2006.01) |
| *C04B 40/02* | (2006.01) |
| *C04B 16/06* | (2006.01) |
| *C04B 14/48* | (2006.01) |
| *C04B 103/50* | (2006.01) |
| *C04B 103/30* | (2006.01) |
| *C04B 24/26* | (2006.01) |
| *B28B 1/14* | (2006.01) |
| *C04B 18/14* | (2006.01) |
| *C04B 24/04* | (2006.01) |

(52) U.S. Cl.
CPC .............. *C04B 14/04* (2013.01); *C04B 14/38* (2013.01); *C04B 14/48* (2013.01); *C04B 16/06* (2013.01); *C04B 18/02* (2013.01); *C04B 18/14* (2013.01); *C04B 18/146* (2013.01); *C04B 22/06* (2013.01); *C04B 24/04* (2013.01); *C04B 24/26* (2013.01); *C04B 28/02* (2013.01); *C04B 40/02* (2013.01); *C04B 40/0263* (2013.01); *C04B 2103/302* (2013.01); *C04B 2103/50* (2013.01); *C04B 2201/52* (2013.01); *Y02W 30/92* (2015.05); *Y02W 30/94* (2015.05)

(56) References Cited

U.S. PATENT DOCUMENTS

| | | |
|---|---|---|
| 2006/0207479 A1 | 9/2006 | Hughes |
| 2010/0326326 A1 | 12/2010 | Rigaud et al. |

FOREIGN PATENT DOCUMENTS

| | | |
|---|---|---|
| JP | 2009-227574 A | 10/2009 |
| JP | 2011-507787 A | 3/2011 |
| JP | 2012-001427 A | 1/2012 |
| JP | 2012-144406 A | 8/2012 |
| WO | 2009/081277 A1 | 7/2009 |

OTHER PUBLICATIONS

JP 2009-227574 A (Ishida) dated Aug. 10, 2009 (English language translation). (Year: 2009).*
Written Opinion of the International Searching Authority dated Nov. 17, 2015 for the corresponding international application No. PCT/JP2015/073916 (English translation).
Extended EP Search Report dated Mar. 19, 2018 issued in corresponding EP patent application No. 15836362.2.

* cited by examiner

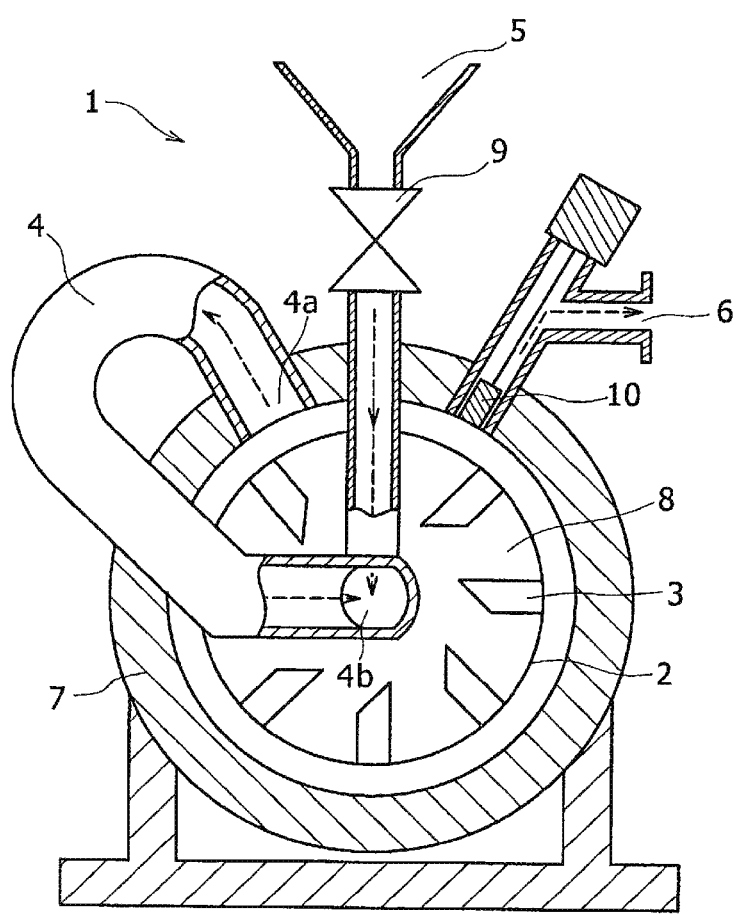

CEMENT COMPOSITION AND MANUFACTURING METHOD FOR CEMENT CURED BODY USING SAME

CROSS REFERENCE TO RELATED APPLICATIONS

This application is a continuation application of U.S. utility application Ser. No. 15/505,142 filed on Feb. 20, 2017, which is a U.S. national stage application of PCT/JP2015/073916 filed on Aug. 25, 2015, and is based on Japanese Patent Application Nos. 2014-170645 filed on Aug. 25, 2014, 2015-034112 filed on Feb. 24, 2015, 2015-059989 filed on Mar. 23, 2015, 2015-104920 filed on May 22, 2015, and 2015-104984 filed on May 22, 2015, the disclosures of which are incorporated herein by reference.

TECHNICAL FIELD

The present invention relates to a cement composition, and to a manufacturing method for a cement cured body (i.e. a cementitious hardened product) using the cement composition.

BACKGROUND ART

In recent years, there have been proposed various cement compositions each having satisfactory fluidity before curing (i.e. being hardened) and being capable of exhibiting high compressive strength after curing.

For example, in Patent Literature 1, there is described a cement composition including (A) cement, (B) a fine powder having a BET specific surface area of from 5 m²/g to 25 m²/g, (C) an inorganic powder having a Blaine specific surface area of from 3,500 cm²/g to 10,000 cm²/g, (D) a fine aggregate, (E) a water reducing agent, and (F) water. The (D) fine aggregate includes a burnt product which contains $2CaO.SiO_2$ and $2CaO.Al_2O_3.SiO_2$, and in which the total amount of $2CaO.Al_2O_3.SiO_2$ and $4CaO.Al_2O_3.Fe_2O_3$ with respect to 100 parts by mass of $2CaO.SiO_2$ is from 10 parts by mass to 100 parts by mass.

When the cement composition is used in a state in which the burnt product contained in the fine aggregate is under an absolute dry condition, the cement composition has fluidity allowing its application before curing and exhibits a high compressive strength of more than 250 N/mm² after curing. When the cement composition is used in a state in which the burnt product contained in the fine aggregate is under a surface dry condition, the cement composition has satisfactory fluidity before curing and exhibits a high compressive strength of 200 N/mm² or more and small self-shrinkage ratio after curing.

CITATION LIST

Patent Literature

[Patent Literature 1] JP 2009-227574 A

SUMMARY OF INVENTION

Technical Problem

In the above-described Patent Literature 1, there are described, as Examples in each of which a flow value is measured with "0-drop", a cement composition having a mass ratio of water to a binding material (i.e. mass ratio of water/binding material) of 0.135, a 0-drop flow value of from 240 mm to 242 mm, and a compressive strength of 280 N/mm², and a cement composition having a mass ratio of water to a binding material of 0.135, a 0-drop flow value of from 270 mm to 275 mm, and a compressive strength of 215 N/mm².

The object of the present invention is to provide a cement composition that has high fluidity (for example, the 0-drop flow value is 200 mm or more) before curing and exhibits high compressive strength (for example, 320 N/mm² or more) after curing.

Solution to Problem

The inventors of the present invention have made extensive investigations in order to achieve the above-mentioned object, and as a result, have found that the above-mentioned object can be achieved by a cement composition which includes a cement, a silica fume having a BET specific surface area of from 10 m²/g to 25 m²/g, an inorganic powder having a 50% cumulative particle size of from 0.8 µm to 5 µm, a fine aggregate having a maximum particle size of 1.2 mm or less, a water reducing agent, an antifoaming agent, and water, and in which each ratio of the cement, the silica fume, and the inorganic powder falls within a particular numerical value range in the total amount of 100 vol % of the cement, the silica fume, and the inorganic powder.

That is, the present invention provides the following items [1] to [10].

[1] A cement composition, which includes: cement; silica fume having a BET specific surface area of from 10 m²/g to 25 m²/g; an inorganic powder having a 50% cumulative particle size (i.e. diameter) of from 0.8 µm to 5 µm; a fine aggregate having a maximum particle size (i.e. diameter) of 1.2 mm or less; a water reducing agent; an antifoaming agent; and water, and in which a ratio of the cement is from 55 vol % to 65 vol %, a ratio of the silica fume is from 5 vol % to 25 vol %, and a ratio of the inorganic powder is from 15 vol % to 35 vol % in a total amount of 100 vol % of the cement, the silica fume, and the inorganic powder.

[2] The cement composition according to the above-mentioned item [1], in which the cement is a cement which is not subjected to (i.e. being not yet subjected to; being free from) polishing treatment, and the BET specific surface area of the silica fume is from 15 m²/g to 25 m²/g.

[3] The cement composition according to the above-mentioned item [1], in which the cement includes:
coarse particles each having a particle size (i.e. diameter) of 20 µm or more, in which an angular surface portion is deformed into a rounded shape, obtained by subjecting particles of moderate-heat Portland cement or low-heat Portland cement to polishing treatment; and
fine particles each having a particle size (i.e. diameter) of less than 20 µm generated by the polishing treatment,
and in which the cement has a 50% weight cumulative particle size (i.e. diameter) of from 10 µm to 18 µm and a Blaine specific surface area of from 2,100 cm²/g to 2,900 cm²/g.

[4] The cement composition according to any one of the above-mentioned items [1] to [3], which includes one or more kinds of fibers selected from the group consisting of metal fibers, organic fibers, and carbon fibers, and in which a ratio of the fibers in the cement composition is 3 vol % or less.

[5] The cement composition according to any one of the above-mentioned items [1] to [4], in which the cement composition has a compressive strength after curing of 320 N/mm² or more.

[6] A method of producing a cementitious cured body made of the cement composition of any one of the above-mentioned items [1] to [5], the method including: a molding step of setting (i.e. supplying or pouring) the cement composition into a mold to provide (i.e. obtain) an uncured molded body; a room temperature (i.e. an ordinary temperature) curing step of subjecting the uncured molded body to sealed curing or atmospheric curing at from 10° C. to 40° C. for 24 hours or more, followed by demolding the molded body from the mold, to thereby provide (i.e. obtain) a cured molded body; a heat curing step of subjecting the cured molded body to steam curing or hot water curing at from 70° C. to 95° C. for 24 hours or more, to thereby provide a cured body after heat curing; and a high-temperature heating step of heating the cured body after the heat curing at from 150° C. to 200° C. for 24 hours or more, to thereby provide (i.e. obtain) the cementitious cured body.

[7] The method of producing a cementitious cured body according to the above-mentioned item [6], further including a water absorbing step of causing the cured molded body to absorb water between the room temperature curing step and the heat curing step.

[8] The method of producing a cementitious cured body according to the above-mentioned item [7], in which the water absorbing step is done by immersing the cured molded body into water under reduced pressure.

[9] The method of producing a cementitious cured body according to the above-mentioned item [7], in which the water absorbing step is done by immersing the cured molded body into boiling water, and then cooling the water to 40° C. or less while keeping the cured molded body immersed in the water.

[10] The method of producing a cementitious cured body according to any one of the above-mentioned items [6] to [9], in which the room temperature curing step includes demolding the cured molded body from the mold at a time when the cured molded body exhibits a compressive strength of from 20 N/mm² to 100 N/mm².

The present invention also provides the following items [11] to [19].

[11] A cement composition which includes a polished product of moderate-heat Portland cement or low-heat Portland cement, and silica fume having a BET specific surface area of from 10 m²/g to 25 m²/g.

[12] The cement composition according to the above-mentioned item [11], which includes an inorganic powder having a 50% weight cumulative particle size (i.e. diameter) of from 0.8 μm to 5 μm.

[13] The cement composition according to the above-mentioned item [11] or [12], in which the polished product of moderate-heat Portland cement or low-heat Portland cement includes:
coarse particles each having a particle size (i.e. diameter) of 20 μm or more, in which an angular surface portion is deformed into a rounded shape, obtained by subjecting particles of the moderate-heat Portland cement or the low-heat Portland cement to polishing treatment; and
fine particles each having a particle size (i.e. diameter) of less than 20 μm generated by the polishing treatment.

[14] The cement composition according to any one of the above-mentioned items [11] to [13], in which the polished product of moderate-heat Portland cement or low-heat Portland cement has a 50% weight cumulative particle size (i.e. diameter) of from 10 μm to 18 μm and a Blaine specific surface area of from 2,100 cm²/g to 2,900 cm²/g.

[15] The cement composition according to any one of the above-mentioned items [11] to [14], which includes one or more kinds of fibers selected from the group consisting of metal fibers, organic fibers, and carbon fibers, and in which a ratio of the fibers in the cement composition is 3 vol % or less.

[16] The cement composition according to any one of the above-mentioned items [11] to [15], further including a fine aggregate, a water reducing agent, and water.

[17] The cement composition according to the above-mentioned item [16], in which the cement composition has a compressive strength after curing of 250 N/mm² or more.

[18] The cement composition according to the above-mentioned item [16] or [17], in which the cement composition has a flow value before curing of 250 mm or more as a value measured by a method described in "JIS R 5201 (Method for physical testing of cement) 11. Flow Test" without performing 15 falling motions.

[19] The method of producing the cement composition of any one of the above-mentioned items [11] to [18], which includes the step of subjecting the moderate-heat Portland cement or the low-heat Portland cement to polishing treatment in a high-speed airflow stirring apparatus, to thereby obtain a polished product of the moderate-heat Portland cement or the low-heat Portland cement.

Advantageous Effects of Invention

The cement composition of the present invention has high fluidity (for example, the 0-drop flow value is 200 mm or more) before curing and can exhibit high compressive strength (for example, 330 N/mm² or more) after curing.

BRIEF DESCRIPTION OF DRAWINGS

FIG. 1 is a front view of one example of a high-speed airflow stirring apparatus, which partially includes across-section view taken along a direction perpendicular to a rotary shaft of a rotor.

DESCRIPTION OF EMBODIMENTS

A cement composition of the present invention is a cement composition which includes cement, silica fume having a BET specific surface area of from 10 m²/g to 25 m²/g (hereinafter sometimes abbreviated as "silica fume"), an inorganic powder having a 50% cumulative particle size of from 0.8 μm to 5 μm (hereinafter sometimes abbreviated as "inorganic powder"), a fine aggregate having a maximum particle size of 1.2 mm or less (hereinafter sometimes abbreviated as "fine aggregate"), a water reducing agent, an antifoaming agent, and water, and
in which a ratio of the cement is from 55 vol % to 65 vol %, a ratio of the silica fume is from 5 vol % to 25 vol %, and a ratio of the inorganic powder is from 15 vol % to 35 vol % in (i.e. based on; with respect to) a total amount of 100 vol % of the cement, the silica fume, and the inorganic powder.

The kind of the cement is not particularly limited, and various Portland cements, such as ordinary Portland cement, high-early-strength Portland cement, ultrahigh-early-strength Portland cement, moderate-heat Portland cement, sulfate-resistant Portland cement, and low-heat Portland cement, may be used.

Of those (i.e. especially), moderate-heat Portland cement or low-heat Portland cement is preferably used with a view to enhancing the fluidity of the cement composition.

A polished product of cement (i.e. the above-mentioned cement) may also be used as the cement used in the present invention.

Each of the case of using a cement that is not subjected to polishing treatment and the case of using a polished product of cement is described below.

[A. Case of Using Cement that is not Subjected to Polishing Treatment]

When a cement that is not subjected to polishing treatment is used, a preferred embodiment of materials other than the cement, and others is as follows.

The BET specific surface area of the silica fume is from 10 m$^2$/g to 25 m$^2$/g, preferably from 15 m$^2$/g to 25 m$^2$/g, more preferably from 17 m$^2$/g to 23 m$^2$/g, and particularly preferably from 18 m$^2$/g to 22 m$^2$/g. It is preferred that the specific surface area be 15 m$^2$/g or more from the viewpoint of the strength exhibiting property of the cement composition. When the specific surface area is more than 25 m$^2$/g, the fluidity of the cement composition before curing decreases.

As examples of the inorganic powder having a 50% cumulative particle size of from 0.8 µm to 5 µm, there are given quartz powder (i.e. silica stone powder), volcanic ash, fly ash (more specifically, classified or pulverized fly ash), and the like.

One kind of those inorganic powders may be used alone, or two or more kinds thereof may be used in combination.

Of those, quartz powder or fly ash is preferably used with a view to enhancing the fluidity and strength exhibiting property of the cement composition.

In this Description, the inorganic powder having a 50% cumulative particle size of from 0.8 µm to 5 µm does not mean (i.e. include) cement.

The 50% cumulative particle size of the inorganic powder is from 0.8 µm to 5 µm, preferably from 1 µm to 4 µm, more preferably from 1.1 µm to 3.5 µm, and particularly preferably 1.2 µm or more and less than 3 µm. When the particle size is less than 0.8 µm, the fluidity of the cement composition decreases. When the particle size is more than 5 µm, the strength exhibiting property of the cement composition decreases.

In this Description, the 50% cumulative particle size of the inorganic powder is based on volume.

The 50% cumulative particle size of the inorganic powder may be determined through use of a commercially available grain size distribution measuring apparatus (for example, "Microtrack HRA, Model 9320-X100" (product name) manufactured by Nikkiso Co., Ltd.).

Specifically, a cumulative grain size curve is created through use of the grain size distribution measuring apparatus, and the 50% cumulative particle size may be determined from the cumulative grain size curve. In this case, measurement is performed with respect to a product obtained by adding 0.06 g of a sample to 20 cm$^3$ of ethanol serving as a solvent in which the sample is to be dispersed, and ultrasonically dispersing the sample for 90 seconds through use of an ultrasonic dispersing apparatus (for example, "US300" (product name) manufactured by Nissei Corporation which has another English name of Nihonseiki Kaisha Ltd.).

The maximum particle size of the inorganic powder is preferably 15 µm or less, more preferably 14 µm or less, and particularly preferably 13 µm or less with a view to enhancing the strength exhibiting property of the cement composition.

The 95% cumulative particle size of the organic powder is preferably 8 µm or less, more preferably 7 µm or less, and particularly preferably 6 µm or less with a view to enhancing the strength exhibiting property of the cement composition.

An inorganic powder containing SiO$_2$ as a main component is preferred as the inorganic powder. The content of SiO$_2$ in the inorganic powder is preferably 50 mass % or more, more preferably 60 mass % or more, and particularly preferably 70 mass % or more, because the strength exhibiting property of the cement composition can be enhanced.

In the cement composition of the present invention, the ratio of the cement is from 55 vol % to 65 vol % (preferably from 57 vol % to 63 vol %), the ratio of the silica fume is from 5 vol % to 25 vol % (preferably from 7 vol % to 23 vol %), and the ratio of the inorganic powder is from 15 vol % to 35 vol % (preferably from 17 vol % to 33 vol %) in the total amount of 100 vol % of the cement, the silica fume, and the inorganic powder.

When the ratio of the cement is less than 55 vol %, the strength exhibiting property of the cement composition decreases. When the ratio of the cement is more than 65 vol %, the fluidity of the cement composition decreases.

When the ratio of the silica fume is less than 5 vol %, the strength exhibiting property of the cement composition decreases. When the ratio of the silica fume is more than 25 vol %, the fluidity of the cement composition decreases.

When the ratio of the inorganic powder is less than 15 vol %, the strength exhibiting property of the cement composition decreases. When the ratio of the inorganic powder is more than 35 vol %, the fluidity of the cement composition decreases.

In this Description, each volume ratio of the cement, the silica fume, and the inorganic powder is a value in terms of blending design calculated based on a mass and an absolute specific gravity.

For example, the volume ratio (%) of the cement in the total amount of 100 vol % of the cement, the silica fume, and the inorganic powder is calculated by the following formula.

[Volume ratio of cement](%)={[Mass of cement]/[Absolute specific gravity of cement]}×100/{[Mass of cement]/[Absolute specific gravity of cement]+[Mass of silica fume]/[Absolute specific gravity of silica fume]+[Mass of inorganic powder]/[Absolute specific gravity of inorganic powder]}

Examples of the fine aggregate include river sand, pit sand, land sand, sea sand, crushed sand, silica sand, a mixture thereof, and the like.

The maximum particle size of the fine aggregate is 1.2 mm or less, and preferably 1.0 mm or less. When the maximum particle size is 1.2 mm or less, the strength exhibiting property of the cement composition can be enhanced.

With regard to the grain size distribution of the fine aggregate, it is preferred that the ratio of a fine aggregate having a particle size of 0.6 mm or less be 95 mass % or more, the ratio of a fine aggregate having a particle size of 0.3 mm or less be from 40 mass % to 50 mass %, and the ratio of a fine aggregate having a particle size of 0.15 mm or less be 6 mass % or less with a view to enhancing the fluidity and the strength exhibiting property of the cement composition.

The ratio of the fine aggregate in the cement composition is preferably from 30 vol % to 40 vol %, and more preferably from 32 vol % to 38 vol %. When the ratio is 30 vol % or more, the fluidity of the cement composition can be enhanced, and the heat generating amount of the cement composition and the contraction amount of the cementitious cured body decrease. When the ratio is 40 vol % or less, the strength exhibiting property of the cement composition can be enhanced.

A water reducing agent, an AE water reducing agent, a high-range water reducing agent, or a high-range AE water reducing agent, each of which may be naphthalenesulfonic acid-based, melamine-based, polycarboxylic acid-based, or the like, may be used as the water reducing agent used in the present invention. Of those, a high-range water reducing agent is preferred, and a polycarboxylic acid-based high-range water reducing agent is more preferred with a view to enhancing the fluidity and the strength exhibiting property of the cement composition.

The blending amount of the water reducing agent is preferably from 0.2 part by mass to 1.5 parts by mass, and more preferably from 0.4 part by mass to 1.2 parts by mass in terms of a solid content with respect to the total amount of 100 parts by mass of the cement, the silica fume, and the inorganic powder. When the blending amount is 0.2 part by mass or more, the water reducing performance and the fluidity of the cement composition are enhanced. When the blending amount is 1.5 parts by mass or less, the strength exhibiting property of the cement composition is enhanced.

A commercially available product may be used as the antifoaming agent.

The blending amount of the antifoaming agent is preferably from 0.001 part by mass to 0.1 part by mass, more preferably from 0.01 part by mass to 0.07 part by mass, and particularly preferably from 0.01 part by mass to 0.05 part by mass in the total amount of 100 parts by mass of the cement, the silica fume, and the inorganic powder. When the blending amount is 0.001 part by mass or more, the strength exhibiting property of the cement composition is enhanced. When the blending amount is more than 0.1 part by mass, the effect of enhancing the strength exhibiting property of the cement composition reaches a peak.

The cement composition of the present invention may contain (i.e. include) one or more kinds of fibers selected from the group consisting of metal fibers (i.e. a metal fiber), organic fibers (i.e. an organic fiber), and carbon fibers (i.e. a carbon fiber) with a view to enhancing the flexural strength (i.e. bending strength), fracture energy, and the like of a cured body (i.e. a cementitious cured body) obtained by curing the cement composition. The ratio of the fibers in the cement composition is preferably 3 vol % or less, more preferably from 0.3 vol % to 2.5 vol %, and particularly preferably from 0.5 vol % to 2.0 vol %. When the ratio is 3 vol % or less, the flexural strength, fracture energy, and the like of the cured body can be enhanced without decreasing the fluidity and workability of the cement composition.

Examples of the metal fibers include steel fibers, stainless fibers, amorphous fibers, and the like. Of those, steel fibers are excellent in strength and are preferred from the viewpoints of cost and ease of availability.

With regard to the dimensions of the metal fibers, it is preferred that the metal fibers each have a diameter of from 0.01 mm to 1.0 mm and a length of from 2 mm to 30 mm, and it is more preferred that the metal fibers each have a diameter of from 0.05 mm to 0.5 mm and a length of from 5 mm to 25 mm with a view to preventing the material separation of the metal fibers in the cement composition and enhancing the flexural strength of the cured body. The aspect ratio (i.e. fiber length/fiber diameter) of each of the metal fibers is preferably from 20 to 200, and more preferably from 40 to 150.

It is preferred that the metal fibers each have a shape of imparting some physical adhesive force (e.g., a helical shape or a wave shape) instead of a straight line shape. When the metal fibers each have a shape such as a helical shape, the metal fibers and a matrix ensure a stress while being pulled out, and hence the flexural strength of the cured body is enhanced.

As the organic fibers, any fibers that can withstand heating in a manufacturing method for a cementitious cured body of the present invention described later may be used. Examples thereof include aramid fibers, polyparaphenylenebenzobisoxazole fibers, polyethylene fibers, and polyarylate fibers.

Examples of the carbon fibers include PAN-based carbon fibers and pitch-based carbon fibers.

With regard to the dimensions of the organic fibers and the carbon fibers, it is preferred that the fibers each have a diameter be from 0.005 mm to 1.0 mm and a length of from 2 mm to 30 mm, and it is more preferred that the fibers each have a diameter of from 0.01 mm to 0.5 mm and a length of from 5 mm to 25 mm with a view to preventing the material separation of those fibers in the cement composition and enhancing the fracture energy of the cured body. The aspect ratio (i.e. fiber length/fiber diameter) of each of the organic fibers and the carbon fibers is preferably from 20 to 200, and more preferably from 30 to 150.

Tap water or the like may be used as the water used in the present invention.

The blending amount of the water is preferably from 10 parts by mass to 20 parts by mass, more preferably from 12 parts by mass to 18 parts by mass, and particularly preferably from 14 parts by mass to 16 parts by mass in (i.e. with respect to) the total amount of 100 parts by mass of the cement, the silica fume, and the inorganic powder. When the blending amount is 10 parts by mass or more, the fluidity of the cement composition is enhanced. When the blending amount is 20 parts by mass or less, the strength exhibiting property of the cement composition is enhanced.

The flow value before curing of the cement composition of the present invention is defined as a value measured by a method described in "JIS R 5201 (Method for physical testing of cement) 11. Flow Test" without performing 15 falling motions (hereinafter sometimes referred to as "0-drop flow value"), and is preferably 200 mm or more, and more preferably 220 mm or more.

The compressive strength of the cementitious cured body obtained by curing the cement composition of the present invention is preferably 320 N/mm$^2$ or more, more preferably 330 N/mm$^2$ or more, still more preferably 350 N/mm$^2$ or more, and particularly preferably 400 N/mm$^2$ or more.

[B. Case of Using Polished Product of Cement]

The details of the polished product of cement, materials other than the polished product of cement, and the like in the case of using the polished product of cement are as follows.

A preferred example of the polished product of cement to be used in the present invention includes coarse particles each having a particle size of 20 μm or more, in which an angular surface portion is deformed into a rounded shape, obtained by subjecting particles forming moderate-heat Portland cement or low-heat Portland cement to polishing treatment, and fine particles each having a particle size of less than 20 μm generated by the above-mentioned polishing treatment.

There is no particular limitation on the upper limit of the particle size of the coarse particles. However, the particle size is generally 200 μm or less in consideration of the general particle size of cement to be used in the present invention, which is to be subjected to polishing treatment, and is preferably 100 μm or less with a view to exhibiting high compressive strength of the cement composition after curing.

There is no particular limitation on the lower limit of the particle size of the fine particles. However, the particle size is preferably 0.1 μm or more, and more preferably 0.5 μm or more with a view to enhancing the fluidity of the cement composition before curing and the ease of manufacturing thereof.

In the present invention, the fluidity of the cement composition before curing is enhanced through use of the polished product formed of the coarse particles and the fine particles.

In order to perform the polishing treatment, a known polishing treatment apparatus capable of polishing particles of cement to be used in the present invention may be used. As one example of the polishing treatment apparatus, there are given a commercially available high-speed airflow stirring apparatus (for example, "Hybridizer NHS-3" (trade name) manufactured by Nara Machinery Co., Ltd.) and the like.

Now, the high-speed airflow stirring apparatus is described in detail with reference to FIG. 1.

The cement to be used in the present invention, which serves as a raw material, is loaded from a loading port 5 in an upper portion of a high-speed airflow stirring apparatus 1 under a state in which an on-off valve 9 is opened. After loading, the on-off valve 9 is closed.

The loaded cement enters a circulation circuit 4 from an opening portion formed in the middle of the circulation circuit 4, and then enters a collision chamber 8, which is a space for accommodating a material to be treated, from an outlet 4b of the circulation circuit 4.

After the raw material (i.e. cement) is loaded, when a rotor (i.e. rotary body) 2 arranged in a stator 7 serving as a fixed body is rotated at high speed, a high-speed airflow is generated by the rotor 2 and blades 3 fixed onto the rotor 2, with the result that the cement in the collision chamber 8 is stirred. During stirring, particles of the cement enter the circulation circuit 4 from an inlet 4a of the circulation circuit 4 formed in the collision chamber 8 and are loaded again into the collision chamber 8 from the outlet 4b of the circulation circuit 4 formed in a center portion of the collision chamber 8, to thereby circulate.

In FIG. 1, the arrow represented by the dotted line indicates a flow of particles (which include the particles of the cement, and coarse particles and fine particles generated by polishing treatment).

Due to stirring, the particles of the cement collide with an inner wall surface of the collision chamber 8, the rotor 2, and the blades 3, and the particles of the cement collide with each other. By these collisions, the particles of the cement are polished to generate coarse particles (i.e. particles each having a particle size of 20 μm or more) in which an angular portion of the surface of each of the particles is changed into a rounded shape, and fine particles (i.e. particles each having a particle size of less than 20 μm).

The rotation speed of the rotor 2 is preferably from 3,000 rpm to 4,200 rpm, and more preferably from 3,500 rpm to 4,000 rpm. When the rotation speed is 3,000 rpm or more, the fluidity of the cement composition before curing is enhanced. When the rotation speed is more than 4,200 rpm, the effect of enhancing the fluidity of the cement composition before curing reaches a peak. In terms of the performance of the high-speed airflow stirring apparatus, it is difficult to set the rotation speed to 4,200 rpm or more.

The time period for the polishing treatment is preferably from 10 minutes to 60 minutes, more preferably from 20 minutes to 50 minutes, still more preferably from 20 minutes to 40 minutes, and particularly preferably from 20 minutes to 30 minutes. When the time period is 10 minutes or more, the fluidity of the cement composition before curing is enhanced. When the time period is more than 60 minutes, the effect of enhancing the fluidity of the cement composition before curing reaches a peak.

The obtained polished product (i.e. the mixture of coarse particles and fine particles) is discharged from a discharge port 6 by opening a discharge valve 10.

The polished product of the cement to be used in the present invention has a 50% weight cumulative particle size of preferably from 10 μm to 18 μm, and more preferably from 12 μm to 16 μm, and has a Blaine specific surface area of preferably from 2,100 cm$^2$/g to 2,900 cm$^2$/g, and more preferably from 2,200 cm$^2$/g to 2,700 cm$^2$/g.

When the 50% weight cumulative particle size is 10 μm or more, the fluidity of the cement composition before curing is enhanced. When the 50% weight cumulative particle size is 18 μm or less, higher compressive strength of the cement composition can be exhibited after curing.

When the Blaine specific surface area is 2,100 cm$^2$/g or more, higher compressive strength of the cement composition can be exhibited after curing. When the Blaine specific surface area is 2,900 cm$^2$/g or less, the fluidity of the cement composition before curing is enhanced.

The BET specific surface area of the silica fume is from 10 m$^2$/g to 25 m$^2$/g, preferably from 12 m$^2$/g to 23 m$^2$/g, and more preferably from 13 m$^2$/g to 22 m$^2$/g. When the BET specific surface area is more than 25 m$^2$/g, the fluidity of the cement composition before curing decreases. It is difficult to obtain silica fume having the BET specific surface area of less than 10 m$^2$/g.

The cement composition of the present invention may contain inorganic powder having a 50% weight cumulative particle size of from 0.8 μm to 5 μm from the viewpoint of the strength exhibiting property of the cement composition. When the cement composition contains such inorganic powder, the strength exhibiting property of the cement composition, particularly, containing the polished product of low-heat Portland cement is enhanced.

As the inorganic powder, one or more kinds selected from quartz powder (i.e. silica stone powder), volcanic ash, fly ash (more specifically, classified or pulverized fly ash), and the like may be used. Of those, quartz powder or fly ash is preferably used from the viewpoint of the strength exhibiting property of the cement composition.

The 50% weight cumulative particle size of the inorganic powder is from 0.8 μm to 5 μm, preferably from 1 μm to 4 μm, more preferably from 1.1 μm to 3.5 μm, and particularly preferably from 1.3 μm to 3 μm. When the particle size is 0.8 μm or more, the fluidity of the cement composition before curing is enhanced. When the particle size is 5 μm or less, the strength exhibiting property of the cement composition is enhanced.

From the viewpoint of the strength exhibiting property of the cement composition, the maximum particle size of the inorganic powder is preferably 15 μm or less, more preferably 14 μm or less, and particularly preferably 13 μm or less, and the 95% weight cumulative particle size of the inorganic powder is preferably 8 μm or less, more preferably 7 μm or less, and particularly preferably 6 μm or less.

In this Description, the inorganic powder does not mean (i.e. include) cement (for example, further finely pulverized cement).

The mass ratio of the silica fume to the total of the polished product of the cement to be used in the present invention and the silica fume (i.e. mass ratio of silica fume/(polished product of cement to be used in the present invention and silica fume) is preferably from 0.05 to 0.20, more preferably from 0.07 to 0.18, and particularly preferably from 0.09 to 0.16 when the cement composition does not contain the inorganic powder. When the ratio is 0.05 or more, a high compressive strength of the cement composition is exhibited after curing. When the ratio is 0.20 or less, the fluidity of the cement composition before curing is enhanced.

When the cement composition contains the inorganic powder, the mass ratio of the silica fume to the powdery raw material (i.e. the polished product of the cement to be used in the present invention, the silica fume, and the inorganic powder) forming the cement composition (i.e. mass ratio of silica fume/powdery raw material forming the cement composition) is preferably from 0.04 to 0.20, more preferably from 0.05 to 0.18, still more preferably from 0.06 to 0.17, and particularly preferably from 0.06 to 0.16. When the ratio is 0.04 or more, a high compressive strength of the cement composition is exhibited after curing. When the ratio is 0.20 or less, the fluidity of the cement composition before curing is enhanced.

The mass ratio of the inorganic powder to the powdery raw material (i.e. the polished product of the cement to be used in the present invention, the silica fume, and the inorganic powder) forming the cement composition (i.e. mass ratio of inorganic powder/powdery raw material forming the cement composition) is preferably from 0.10 to 0.35, more preferably from 0.13 to 0.32, and particularly preferably from 0.16 to 0.30. When the ratio is 0.10 or more, a high compressive strength of the cement composition is exhibited after curing. When the ratio is 0.35 or less, the fluidity of the cement composition before curing is enhanced.

The 50% weight cumulative particle size and the 95% weight cumulative particle size of the inorganic powder may be determined by the same method as the above-mentioned method through use of a commercially available grain size distribution measuring apparatus (for example, "Microtrack HRA, Model 9320-X100" (product name) manufactured by Nikkiso Co., Ltd.), as described in the above-mentioned [A. Case of using cement that is not subjected to polishing treatment] section.

In the cement composition of the present invention, the ratio of the polished product of cement is from 55 vol % to 65 vol % (preferably from 57 vol % to 63 vol %), the ratio of the silica fume is from 5 vol % to 25 vol % (preferably from 7 vol % to 23 vol %), and the ratio of the inorganic powder is from 15 vol % to 35 vol % (preferably from 17 vol % to 33 vol %) in the total amount of 100 vol % of the polished product of cement, the silica fume, and the inorganic powder.

The definition of the volume ratio and the reasons for the preferred ranges of the volume ratios are the same as those in the above-mentioned [A. Case of using cement that is not subjected to polishing treatment] section.

As examples of materials other than the polished product of cement, the silica fume, and the inorganic powder that may be included in the cement composition of the present invention, there are given a fine aggregate, a coarse aggregate, a water reducing agent, water, an antifoaming agent (i.e. air amount adjuster), and the like.

River sand, pit sand, land sand, sea sand, crushed sand, silica sand, a mixture thereof, or the like may be used as the fine aggregate used in the present invention.

Of those, it is preferred that silica sand having a maximum particle size of 1 mm or less be used from the viewpoints of the fluidity and the strength exhibiting property of the cement composition.

The maximum particle size of the fine aggregate is 1.2 mm or less, and preferably 1.0 mm or less. When the maximum particle size is 1.2 mm or less, the strength exhibiting property of the cement composition can be enhanced.

With regard to the grain size distribution of the fine aggregate, it is preferred that the ratio of an aggregate having a particle size of 0.6 mm or less be 95 mass % or more, the ratio of an aggregate having a particle size of 0.3 mm or less be from 40 mass % to 50 mass %, and the ratio of an aggregate having a particle size of 0.15 mm or less be 6 mass % or less with a view to enhancing the fluidity and the strength exhibiting property of the cement composition.

The mass ratio of the fine aggregate to the powdery raw material (i.e. the polished product of the cement to be used in the present invention, the silica fume, and the inorganic powder) forming the cement composition (i.e. mass ratio of fine aggregate/powdery raw material forming the cement composition) is preferably from 0.2 to 1.0, more preferably from 0.25 to 0.9, and particularly preferably from 0.3 to 0.8. When the ratio is 0.2 or more, the heat generating amount of the cement composition and the contraction amount of the cement composition after curing decrease. When the ratio is 1.0 or less, a high compressive strength of the cement composition is exhibited after curing.

River gravel, pit gravel, land gravel, crushed stone, a mixture thereof, or the like may be used as the coarse aggregate used in the present invention.

When the coarse aggregate is used, the ratio of the fine aggregate (i.e. the sand percentage in the total amount of aggregate) is preferably 30% or more. When the ratio of the fine aggregate is 30% or more, the workability and the ease of molding of the cement composition are enhanced.

A water reducing agent, an AE water reducing agent, a high-range water reducing agent, or a high-range AE water reducing agent, each of which is lignin-based, naphthalene-sulfonic acid-based, melamine-based, polycarboxylic acid-based, or the like, may be used as the water reducing agent used in the present invention. Of those, a high-range water reducing agent is preferred, and a polycarboxylic acid-based high-range water reducing agent is more preferred with a view to enhancing the fluidity and the strength exhibiting property of the cement composition. Through blending of the water reducing agent, the fluidity and workability of the cement composition before curing, the strength exhibiting property and denseness (i.e. compactness) thereof after curing, and the like can be enhanced.

The mass ratio of the water reducing agent to the powdery raw material (i.e. the polished product of the cement to be used in the present invention, the silica fume, and the inorganic powder) forming the cement composition (i.e. mass ratio of water reducing agent/powdery raw material forming the cement composition) is preferably from 0.001 to 0.04, more preferably from 0.002 to 0.03, and particularly preferably from 0.003 to 0.01 in terms of solid content. When the ratio is 0.001 or more, it is easy to knead the cement composition. When the ratio is 0.04 or less, curing retardation is unlikely to occur, and cost can be reduced.

One or more kinds of fibers selected from the group consisting of metal fibers, organic fibers, and carbon fibers may be included in the cement composition of the present invention in the same manner as in the above-mentioned "A. Case of using cement that is not subjected to polishing treatment" section.

The details (i.e. material, blending amount, etc.) of the fibers that may be included in the cement composition are the same as those in the above-mentioned "A. Case of using cement that is not subjected to polishing treatment" section.

Tap water or the like may be used as the water used in the present invention.

In the present invention, the mass ratio of water to the powdery raw material (i.e. the polished product of the cement to be used in the present invention, the silica fume, and the inorganic powder) forming the cement composition (i.e. mass ratio of water/powdery raw material forming the cement composition) is preferably from 0.08 to 0.18, and more preferably from 0.09 to 0.16. When the ratio is 0.08 or more, it is easy to knead the cement composition. When the ratio is 0.18 or less, a high compressive strength of the cement composition is exhibited after curing.

A method of producing (i.e. manufacturing) a cement composition of the present invention includes the step of subjecting the cement to be used in the present invention to polishing treatment in a high-speed airflow stirring apparatus, to thereby provide a polished product of the cement.

The cement composition of the present invention can be obtained by mixing the obtained polished product with the silica fume and the others. There is no particular limitation on a mixing (i.e. kneading) method. There is no particular limitation on an apparatus to be used for mixing, either, and a commonly-used mixer, e.g., an omnimixer, a pan-type mixer, a biaxial kneading mixer, or a tilting type mixer may be used.

The cement composition (i.e. mortar) obtained by kneading the polished product of cement, the silica fume, the inorganic powder, the fine aggregate, the water reducing agent, water, and the fibers to be included arbitrarily (i.e. optionally) has high fluidity before curing and can exhibit high compressive strength after curing.

When the inorganic powder is not used, the compressive strength after curing of the mortar is preferably 250 N/mm$^2$ or more, more preferably 255 N/mm$^2$ or more, and still more preferably 260 N/mm$^2$ or more.

When the inorganic powder (i.e. inorganic powder having a 50% weight cumulative particle size of from 0.8 μm to 5 μm) is used, the compressive strength after curing of the mortar is 320 N/mm$^2$ or more, preferably 360 N/mm$^2$ or more, more preferably 380 N/mm$^2$ or more, and still more preferably 400 N/mm$^2$ or more.

The flow value before curing of the mortar is defined as a value measured by a method described in "JIS R 5201 (Method for physical testing of cement) 11. Flow Test" without performing 15 falling motions (abbreviated as flow value (0-drop) in this Description), and is preferably 250 mm or more, more preferably 255 mm or more, still more preferably 260 mm or more, and particularly preferably 265 mm or more.

It is preferred that the mortar have an air amount of about 2% from the viewpoints of the strength exhibiting property and the like. For this reason, the air amount of the mortar may be adjusted through use of an antifoaming agent (i.e. air amount adjuster).

[Manufacturing Method for Cementitious Cured Body]

Next, a manufacturing method for a cementitious cured body obtained by curing the cement composition of the present invention (which contains cement that is not subjected to polishing treatment, or contains a polished product of cement) is described in detail.

An example of the production (i.e. manufacturing) method for a cementitious cured body (i.e. a cement-based hardened product) of the present invention includes: a molding step of setting the cement composition into a mold to provide an uncured molded body; a room temperature curing step of subjecting the uncured molded body to sealed curing or atmospheric curing at from 10° C. to 40° C. for 24 hours or more, followed by demolding the molded body from the mold, to thereby provide a cured molded body; a heat curing step of subjecting the cured molded body to steam curing or hot water curing at from 70° C. to 95° C. for 24 hours or more, to thereby provide a cured body after heat curing; and a high-temperature heating step of heating the cured body after heat curing at from 150° C. to 200° C. for 24 hours or more, to thereby provide the cementitious cured body.

[Molding Step]

This step is a step of setting the cement composition into a mold to provide an uncured molded body.

There is no particular limitation on a method of kneading the cement composition of the present invention before setting the cement composition into the mold. There is no particular limitation on an apparatus to be used for kneading, either, and a commonly-used mixer, e.g., an omnimixer, a pan-type mixer, a biaxial kneading mixer, or a tilting type mixer may be used. There is no particular limitation on a method of setting the cement composition into the mold (i.e. a method of molding the cement composition), either.

[Room Temperature Curing Step]

This step is a step of subjecting the uncured molded body to sealed curing or atmospheric curing at from 10° C. to 40° C. (preferably from 15° C. to 30° C.) for 24 hours or more (preferably from 24 hours to 72 hours, and more preferably from 24 hours to 48 hours), and demolding the molded body from the mold, to thereby provide a cured molded body.

When the curing temperature is 10° C. or more, the curing time period can be shortened. When the curing temperature is 40° C. or less, the compressive strength of the cementitious cured body can be enhanced.

When the curing time period is 24 hours or more, defects such as chipping and cracking are less liable to occur in the cured molded body when the cured molded body is demolded.

In this step, it is preferred that the cured molded body be demolded from the mold when the cured molded body exhibits a compressive strength of preferably from 20 N/mm$^2$ to 100 N/mm$^2$, and more preferably from 30 N/mm$^2$ to 80 N/mm$^2$. When the compressive strength is 20 N/mm$^2$ or more, defects such as chipping and cracking are less liable to occur in the cured molded body when the cured molded body is demolded. When the compressive strength is 100 N/mm$^2$ or less, the cured molded body can be caused to absorb water with a small amount of labor in a water absorbing step described later.

[Heat Curing Step]

This step is a step of subjecting the cured molded body obtained in the previous step to steam curing or hot water curing at from 70° C. to 95° C. (preferably from 75° C. to 92° C.) for 24 hours or more (preferably from 24 hours to 96 hours, and more preferably from 36 hours to 72 hours), to thereby provide a cured body after heat curing.

When the curing temperature is 70° C. or more, the curing time period can be shortened. When the curing temperature is 95° C. or less, the compressive strength of the cementitious cured body can be enhanced.

When the curing time period is 24 hours or more, the compressive strength of the cementitious cured body can be enhanced.

[High-Temperature Heating Step]

This step is a step of heating the cured body after heat curing at from 150° C. to 200° C. (preferably from 170° C. to 190° C.) for 24 hours or more (preferably from 24 hours to 72 hours, and more preferably from 36 hours to 48 hours), to thereby provide the cementitious cured body.

When the heating temperature is 150° C. or more, the curing time period can be shortened. When the heating temperature is 200° C. or less, the compressive strength of the cementitious cured body can be enhanced.

When the heating time period is 24 hours or more, the compressive strength of the cementitious cured body can be enhanced.

[Water Absorbing Step]

A water absorbing step of causing the cured molded body obtained in the room temperature curing step to absorb water may be inserted between the room temperature curing step and the heat curing step.

As examples of a method of causing the cured molded body to absorb water, there is given a method involving immersing the molded body into water. Examples of the method involving immersing the molded body into water include: (1) a method involving immersing the molded body into water under reduced pressure; (2) a method involving immersing the molded body into boiling water, and lowering the water temperature to 40° C. or less while keeping the molded body immersed in the water; and (3) a method involving immersing the molded body into boiling water, taking the molded body out of the boiling water, and then immersing the molded body into water at 40° C. or less with a view to increasing the water absorption amount in a short time period and increasing the compressive strength of the cementitious cured body.

As one of examples of the method involving immersing the molded body into water under reduced pressure, there is given a method involving using a facility such as a vacuum pump, a large decompression container, or the like.

As one of examples of the method involving immersing the molded body into boiling water, there is given a method involving using a facility such as a high-temperature and high-pressure container, a heated water tank, or the like.

The time period for immersing the cured molded body into water under reduced pressure or boiling water is preferably 3 minutes or more, more preferably 8 minutes or more, and particularly preferably 20 minutes or more with a view to increasing a water absorption rate. The upper limit of the time period is preferably 60 minutes, and more preferably 45 minutes with a view to further increasing the compressive strength of the cementitious cured body.

The water absorption rate is preferably 0.2 vol % or more, more preferably from 0.3 vol % to 2.0 vol %, and particularly preferably from 0.35 vol % to 1.7 vol % as a ratio of water with respect to 100 vol % of the cured molded body of φ50×100 mm. When the water absorption rate is 0.2 vol % or more, the compressive strength of the cementitious cured body can be further increased.

EXAMPLES

Now, the present invention is described in more detail by way of Examples. However, the present invention is not limited to Examples described below.

[A. Experimental Example Using Cement that is not Subjected to Polishing Treatment]

[Materials Used]

Materials used are as follows.
(1) Cement: low-heat Portland cement (manufactured by Taiheiyo Cement Corporation)
(2) Silica fume A: BET specific surface area: 20 $m^2/g$
(3) Silica fume B: BET specific surface area: 17 $m^2/g$
(4) Inorganic powder A: silica stone powder, 50% cumulative particle size: 2 μm, maximum particle size: 12 μm, 95% cumulative particle size: 5.8 μm
(5) Inorganic powder B: silica stone powder, 50% cumulative particle size: 7 μm, maximum particle size: 67 μm, 95% cumulative particle size: 27 μm
(6) Fine aggregate: silica sand (maximum particle size: 1.0 mm, aggregate having a particle size of 0.6 mm or less: 98 mass %, aggregate having a particle size of 0.3 mm or less: 45 mass %, aggregate having a particle size of 0.15 mm or less: 3 mass %)
(7) Polycarboxylic acid-based high-range water reducing agent: solid content: 27.4 mass %, manufactured by Flowric Co., Ltd., trade name: "FLOWRIC SF500U"
(8) Antifoaming agent: manufactured by BASF Japan Ltd., trade name: "MasterAir 404"
(9) Water: tap water
(10) Metal fiber: steel fiber (diameter: 0.2 mm, length: 15 mm)

Example 1

The cement, the silica fume A, and the inorganic powder A were mixed so that each ratio of the cement and the others reached a ratio shown in Table 1 with respect to the total amount of 100 vol % of powdery raw material (i.e. the cement, the silica fume, and the inorganic powder). The obtained mixture and the fine aggregate in such amounts that the ratio of the fine aggregate in the cement composition reached a ratio shown in Table 1 were loaded into an omnimixer, and the mixture was subjected to dry kneading for 15 seconds.

Then, water, the polycarboxylic acid-based high-range water reducing agent, and the antifoaming agent were loaded into the omnimixer in amounts shown in Table 1, and the resultant was kneaded for 2 minutes.

After kneading, the kneaded product adhering to the side wall of the omnimixer was scraped off, and the resultant was kneaded further for 4 minutes.

The flow value of the cement composition after kneading was measured by a method described in "JIS R 5201 (Method for physical testing of cement) 11. Flow Test" without performing 15 falling motions. The flow value is referred to as "0-drop flow value" as described above.

The obtained kneaded product was set into a cylindrical mold of φ50×100 mm to provide an uncured molded body. After setting the kneaded product into the mold, the uncured molded body was subjected to sealed curing at 20° C. for 48 hours and then demolded to provide a cured molded body. The molded body during demolding had a compressive strength of 50 $N/mm^2$.

The molded body was immersed into water in a desiccator under reduced pressure for a time period shown in Table 2 (described as "under reduced pressure" in Table 2). The reduction in pressure was performed through use of "Aspirator (AS-01)" manufactured by AS ONE Corporation. The masses of the molded body before and after immersion were measured, and a water absorption rate was calculated based on the obtained measurement values.

After immersion, the molded body was subjected to steam curing at 90° C. for 48 hours and then decreased in temperature to 20° C. After that, the resultant was heated at 180° C. for 48 hours.

The compressive strength of the molded body (i.e. cementitious cured body) after heating was measured in accordance with "JIS A 1108 (Compressive strength test method for concrete)."

Example 2

A cement composition and a cured body (i.e. a molded body) thereof were obtained in the same manner as in Example 1 except that the blending amount of water per 100 parts by mass of the powdery raw material was changed from 13 parts by mass to 15 parts by mass.

The measurement of the 0-drop flow value of the cement composition and the like were performed in the same manner as in Example 1. The molded body during demolding had a compressive strength of 45 N/mm$^2$.

Example 3

A cement composition and a cured body thereof were obtained in the same manner as in Example 1 except that the molded body after demolding was immersed into water that was boiling (i.e. boiling water) for a time period shown in Table 2 and cooled until the water temperature reached 25° C. while the molded body was kept immersed in the water, instead of being immersed into water in the desiccator under reduced pressure.

The calculation of a water absorption rate, and the measurement of compressive strength of the cementitious cured body were performed in the same manner as in Example 1.

Example 4

A cement composition and a cured body (i.e. a molded body) thereof were obtained in the same manner as in Example 2 except that the molded body after demolding was treated (for example, being immersed into boiling water) in the same manner as in Example 3, instead of being immersed into water in the desiccator under reduced pressure.

The calculation of a water absorption rate, and the measurement of compressive strength of the cementitious cured body were performed in the same manner as in Example 1.

Example 5

A cement composition and a cured body (i.e. a molded body) were obtained in the same manner as in Example 1 except that the blending amount of the silica fume A was changed from 10 vol % to 20 vol %, and the blending amount of the inorganic powder A was changed from 30 vol % to 20 vol %.

The measurement of the 0-drop flow value and the like were performed in the same manner as in Example 1. The molded body during demolding had a compressive strength of 50 N/mm$^2$.

Example 6

A cement composition and a cured body (i.e. molded body) thereof were obtained in the same manner as in Example 5 except that the molded body after demolding was treated (for example, being immersed into boiling water) in the same manner as in Example 3, instead of being immersed into water in the desiccator under reduced pressure.

The calculation of a water absorption rate, and the measurement of compressive strength of the cementitious cured body were performed in the same manner as in Example 1.

Example 7

A cement composition and a cured body (i.e. a molded body) were obtained in the same manner as in Example 2 except that the blending amount of the silica fume A was changed from 10 vol % to 20 vol %, and the blending amount of the inorganic powder A was changed from 30 vol % to 20 vol %.

The measurement of the 0-drop flow value and the like were performed in the same manner as in Example 1. The molded body during demolding had a compressive strength of 45 N/mm$^2$.

Example 8

A cement composition and a cured body (i.e. a molded body) thereof were obtained in the same manner as in Example 7 except that the molded body after demolding was treated (for example, being immersed into boiling water) in the same manner as in Example 3, instead of being immersed into water in the desiccator under reduced pressure.

The calculation of a water absorption rate, and the measurement of compressive strength of the cementitious cured body were performed in the same manner as in Example 1.

Example 9

The cement, the silica fume A, and the inorganic powder A were mixed so that each ratio of the cement and the others reached a ratio shown in Table 1 with respect to the total amount of 100 vol % of powdery raw material (i.e. the cement, the silica fume, and the inorganic powder). The obtained mixture and the fine aggregate in such amounts that the ratio of the fine aggregate in the cement composition reached a ratio shown in Table 1 were loaded into an omnimixer, and the mixture was subjected to dry kneading for 15 seconds.

Then, water, the polycarboxylic acid-based high-range water reducing agent, and the antifoaming agent were loaded into the omnimixer in amounts shown in Table 1, and the resultant was kneaded for 2 minutes.

After kneading, the kneaded product adhering to the side wall of the omnimixer was scraped off, and the resultant was kneaded further for 4 minutes. After that, the metal fibers in such an amount that the ratio of the metal fibers in the cement composition reached a ratio shown in Table 1 were loaded into the omnimixer, and the resultant was kneaded further for 2 minutes.

The obtained cement composition was measured for a 0-drop flow value in the same manner as in Example 1.

A cementitious cured body (i.e. molded body) was obtained by the same method as that of Example 1 through use of the obtained cement composition as a material.

The obtained cementitious cured body (i.e. molded body) was measured for a water absorption rate and compressive strength in the same manner as in Example 1.

The flexural strength of the obtained cementitious cured body was measured in accordance with "Japan Society of Civil Engineering Standard JSCE-G 552-2010 (Test method for bending strength and bending toughness of steel fiber reinforced concrete)."

Example 10

A cement composition and a cured body thereof were obtained in the same manner as in Example 9 except that the molded body after demolding was treated (for example, being immersed into boiling water) in the same manner as in Example 3, instead of being immersed into water in the desiccator under reduced pressure.

The cement composition and the cured body thereof were measured for various physical properties in the same manner as in Example 9.

Comparative Example 1

The cement, the silica fume B, and the inorganic powder B were mixed so that each ratio of the cement and the others reached a ratio shown in Table 1 with respect to the total amount of 100 vol % of powdery raw material (i.e. the cement, the silica fume, and the inorganic powder). The obtained mixture and the fine aggregate in such amounts that the ratio of the fine aggregate in the cement composition reached a ratio shown in Table 1 were loaded into an omnimixer, and the mixture was subjected to dry kneading for 15 seconds.

Then, water, the polycarboxylic acid-based high-range water reducing agent, and the antifoaming agent were loaded into the omnimixer in amounts shown in Table 1, and the resultant was kneaded for 2 minutes.

After kneading, the kneaded product adhering to the side wall of the omnimixer was scraped off, and the resultant was kneaded further for 4 minutes.

A cementitious cured body was obtained in the same manner as in Example 1 through use of the kneaded product as a material.

The obtained kneaded product (i.e. cement composition) and the cured body thereof were measured for various physical properties in the same manner as in Example 1.

The results are shown in Table 2.

TABLE 1

| | Powdery raw material (100 vol %) | | | | Water[1] | Fine | High-range water reducing agent[3] | Antifoaming agent[4] | Metal |
| | Cement | Silica fume | | Inorganic powder | | (Part(s) | aggregate[2] | (Part(s) by | (Part(s) by | fiber[5] |
| | (vol %) | Kind | (vol %) | Kind | (vol %) | by mass) | (vol %) | mass) | mass) | (vol %) |
|---|---|---|---|---|---|---|---|---|---|---|
| Example 1 | 60 | A | 10 | A | 30 | 13 | 35.5 | 0.69 | 0.02 | — |
| Example 2 | | A | | A | | 15 | | | | |
| Example 3 | | A | | A | | 13 | | | | |
| Example 4 | | A | | A | | 15 | | | | |
| Example 5 | | A | 20 | A | 20 | 13 | | | | |
| Example 6 | | A | | A | | 13 | | | | |
| Example 7 | | A | | A | | 15 | | | | |
| Example 8 | | A | | A | | 15 | | | | |
| Example 9 | | A | 10 | A | 30 | 15 | | 0.74 | | 2 |
| Example 10 | | A | | A | | 15 | | | | |
| Comparative Example 1 | 57 | B | 22 | B | 21 | 14 | 32.5 | 0.55 | 0.04 | — |

[1] Part(s) by mass with respect to 100 parts by mass of powdery raw material (cement, silica fume, and inorganic powder)
[2] Ratio in cement composition
[3] Part(s) by mass with respect to 100 parts by mass of powdery raw material (in terms of solid content)
[4] Part(s) by mass with respect to 100 parts by mass of powdery raw material
[5] Ratio in cement composition

TABLE 2

| | Flow value (0-drop) (mm) | Immersion Method | Time period (minute(s)) | Water absorption rate (vol %) | Compressive strength (N/mm$^2$) | Flexural strength (N/mm$^2$) |
|---|---|---|---|---|---|---|
| Example 1 | 230 | Under reduced pressure | — | 0 | 350 | — |
| | | | 1 | 0.19 | 361 | — |
| | | | 5 | 0.23 | 371 | — |
| | | | 10 | 0.33 | 380 | — |
| | | | 30 | 0.37 | 405 | — |
| Example 2 | 295 | Under reduced pressure | — | 0 | 350 | — |
| | | | 1 | 0.18 | 356 | — |
| | | | 5 | 0.34 | 369 | — |
| | | | 10 | 0.39 | 388 | — |
| | | | 30 | 0.41 | 464 | — |
| | | | 90 | 0.42 | 451 | — |
| | | | 120 | 0.51 | 453 | — |
| Example 3 | 230 | Boiling water | 30 | 0.54 | 411 | — |

TABLE 2-continued

| | Flow value (0-drop) (mm) | Immersion Method | Immersion Time period (minute(s)) | Water absorption rate (vol %) | Compressive strength (N/mm$^2$) | Flexural strength (N/mm$^2$) |
|---|---|---|---|---|---|---|
| Example 4 | 295 | Boiling water | 30 | 0.36 | 450 | — |
| Example 5 | 230 | Under reduced pressure | 30 | 0.36 | 403 | — |
| Example 6 | 230 | Boiling water | 30 | 0.37 | 405 | — |
| Example 7 | 290 | Under reduced pressure | 30 | 0.41 | 462 | — |
| Example 8 | 290 | Boiling water | 30 | 0.42 | 465 | — |
| Example 9 | 260 | Under reduced pressure | 30 | 0.41 | 460 | 40 |
| Example 10 | 262 | Boiling water | 30 | 0.36 | 445 | 41 |
| Comparative Example 1 | 270 | Under reduced pressure | — | 0 | 290 | — |

It is understood from Table 2 that the cement compositions (i.e. Examples 1 to 10) of the present invention each have a 0-drop flow value of 230 mm or more. It is also understood that the cementitious cured bodies obtained by curing the cement compositions of the present invention each have an extremely high compressive strength of 350 N/mm$^2$ or more.

It is also understood that the cement compositions (i.e. Examples 9 and 10) containing metal fibers each have a high flexural strength of 40 N/mm$^2$ or more.

Meanwhile, it is understood that the cementitious cured body according to Comparative Example 1 has a compressive strength of 290 N/mm$^2$, which is smaller than those of Examples 1 to 10.

[B. Experimental Example Using Polished Product of Cement]

[Materials Used]

Materials used are as follows.

(1) Moderate-heat Portland cement: manufactured by Taiheiyo Cement Corporation
(2) Low-heat Portland cement: manufactured by Taiheiyo Cement Corporation
(3) Silica fume A: BET specific surface area: 14 m$^2$/g
(4) Silica fume B: BET specific surface area: 20 m$^2$/g
(5) Inorganic powder: silica stone powder (50% weight cumulative particle size: 2.0 μm; 95% weight cumulative particle size: 5.8 μm; maximum particle size: 12 μm or less)
(6) Fine aggregate A: pit sand collected in Kakegawa
(7) Fine aggregate B: silica sand (maximum particle size: 1.2 mm or less; particle fraction (i.e. ratio of particles) of 0.6 mm or less: 98 mass %; particle fraction of 0.3 mm or less: 45 mass %; particle fraction of 0.15 mm or less: 3 mass %)
(8) Polycarboxylic acid-based high-range water reducing agent: solid content: 27.4 mass %; manufactured by Flowric Co., Ltd., trade name: "FLOWRIC SF500U"
(9) Antifoaming agent (i.e. air amount adjuster): manufactured by BASF Japan Ltd., trade name: "MasterAir 404"
(10) Water: water from waterworks
(11) Metal fiber: steel fiber (diameter: 0.2 mm, length: 15 mm)

[Manufacturing of Each Polished Product of Moderate-Heat Portland Cement and Low-Heat Portland Cement]

The moderate-heat Portland cement or the low-heat Portland cement was subjected to polishing treatment for 30 minutes under a condition of a rotation speed of 4,000 rpm through use of a high-speed airflow stirring apparatus ("Hybridizer NHS-3" (trade name) manufactured by Nara Machinery Co., Ltd.). In the polishing treatment, the loading amount of the moderate-heat Portland cement or the low-heat Portland cement was set to 800 g per batch. The 50% weight cumulative particle sizes and the Blaine specific surface areas of the moderate-heat Portland cement or the low-heat Portland cement, and the polished product of the moderate-heat Portland cement or the low-heat Portland cement were measured. The results are shown in Table 3.

When a secondary electron image of the polished product was observed through use of a scanning electron microscope, it was found that coarse particles (i.e. particles each having a particle size of 20 μm or more) of the polished product had a few angular surface portions as compared to particles (i.e. particles before polishing treatment) of the moderate-heat Portland cement or the low-heat Portland cement, and thus the surface portions were deformed into rounded surface portions. Fine particles (i.e. particles each having a particle size of less than 20 μm) were present in the spaces between the coarse particles.

TABLE 3

| Cement | | 50% weight cumulative particle size (μm) | Blaine specific surface area (cm$^2$/g) |
|---|---|---|---|
| Moderate-heat Portland cement | Before polishing treatment | 19.4 | 3,150 |
| | After polishing treatment | 12.8 | 2,570 |
| Low-heat Portland cement | Before polishing treatment | 15.7 | 3,320 |
| | After polishing treatment | 15.0 | 2,350 |

Reference Example 1

The polished product of the moderate-heat Portland cement, the silica fume A, the fine aggregate A, the high-range water reducing agent, and water were loaded into a Hobart mixer in a lump (i.e. at one time) in blending amounts shown in Table 4. After that, the mixture was kneaded at low speed for 9 minutes to prepare a mortar. The antifoaming agent (i.e. air amount adjuster) was added to the obtained mortar so that the air amount in the mortar reached 2 vol %.

Each volume ratio of the polished product of the cement and the silica fume, which form the powdery raw material, is shown in Table 5. The values of Table 5 are calculated based on the values of Table 4 and true density.

The flow value of the mortar after kneading was measured by a method described in "JIS R 5201 (Method for physical testing of cement) 11. Flow Test" without performing 15 falling motions.

The mortar after kneading was molded through use of a mold which has a cylindrical inner space having a diameter of 50 mm and a height of 100 mm, and was allowed to stand still at 20° C. for 72 hours. Then, the mortar was demolded to provide a cured molded body.

The cured molded body was subjected to steam curing at 85° C. for 72 hours, and the compressive strength of the obtained cured body was measured in accordance with "JIS A 1108 (Compressive strength test method for concrete)" to be 260 N/mm$^2$.

The cured body was heated at 180° C. for 48 hours through use of a drying furnace. The compressive strength of the cured body after heating was measured in the same manner as in the cured body before heating. The compressive strength was measured through use of a 100 t universal testing machine (hydraulic type) manufactured by Shimadzu Corporation.

The flow value (0-drop) and the compressive strength of the cured body after heating are shown in Table 6.

Reference Example 2

A mortar was prepared in the same manner as in Reference Example 1 except that the blending amount of each material was set to the blending amount shown in Table 4, and the materials were kneaded at low speed for 12 minutes.

The flow value (0-drop) of the mortar after kneading was measured in the same manner as in Reference Example 1.

A cured body was obtained in the same manner as in Reference Example 1 through use of the mortar after kneading, and then the compressive strength of the cured body was measured.

Example 11

The polished product of the low-heat Portland cement, the silica fume B, the silica stone powder, the fine aggregate B, the high-range water reducing agent, and water were kneaded in blending amounts shown in Table 4. The antifoaming agent (i.e. air amount adjuster) was added to the obtained mortar so that the ratio of the air amount in the mortar reached 2 vol %.

Specifically, the powdery raw material (i.e. the polished product of low-heat Portland cement, the silica fume B, and the silica stone powder) and the fine aggregate B were loaded into an omnimixer to be subjected to dry kneading for 15 seconds. Then, the water, the high-range water reducing agent, and the antifoaming agent (i.e. air amount adjuster) were added to the mixture, and the resultant was kneaded for 2 minutes. Then, the kneaded product adhering to the side wall of the omnimixer was scraped off, and the resultant was further kneaded for 4 minutes.

Each volume ratio of the polished product of the cement, the silica fume, and the silica stone powder, which form the powdery raw material, is shown in Table 5. The values of Table 5 are calculated based on the values of Table 4 and true density.

The flow value (0-drop) of the mortar after kneading was measured in the same manner as in Reference Example 1.

The mortar after kneading was molded through use of a mold which has a cylindrical inner space having a diameter of 50 mm and a height of 100 mm, and was allowed to stand still at 20° C. for 72 hours. Then, the mortar was demolded to provide a cured molded body. The compressive strength of the molded body during demolding was 52 N/mm$^2$.

The cured molded body was subjected to steam curing at 90° C. for 48 hours and decreased in temperature to 20° C. The obtained cured body was heated at 180° C. for 48 hours through use of a drying furnace. The compressive strength of the cured body after heating was measured in the same manner as in Reference Example 1.

Example 12

A mortar and a cured body thereof were obtained in the same manner as in Example 11 except that the polished product of moderate-heat Portland cement was used instead of the polished product of low-heat Portland cement. In manufacturing of the cured body, the compressive strength of the cured molded body during demolding was 55 N/mm$^2$.

The flow value (0-drop) of the mortar and the compressive strength of the cured body were measured in the same manner as in Reference Example 1.

Example 13

A mortar and a cured body thereof were obtained in the same manner as in Example 12 except that the mass ratio of water to the powdery raw material (i.e. water/powdery raw material) was changed from 0.12 to 0.15. In manufacturing of the cured body, the compressive strength of the cured molded body during demolding was 50 N/mm$^2$.

The flow value (0-drop) of the mortar and the compressive strength of the cured body were measured in the same manner as in Reference Example 1.

Example 14

A cured body was obtained in the same manner as in Example 11 except that the molded body after demolding was immersed into water that was boiling (i.e. boiling water) for 30 minutes and then cooled until the water temperature reached 25° C. while the molded body was kept immersed in the water.

The compressive strength of the cured body was measured in the same manner as in Reference Example 1. The compressive strength of the cured body was more than a measurement limit (i.e. 511 N/mm$^2$) of the measuring apparatus.

The masses of the molded body before and after immersion were measured, and a water absorption rate was calculated based on the obtained measurement values.

Example 15

A cured body was obtained in the same manner as in Example 11 except that the molded body after demolding was immersed into water in a desiccator under reduced pressure for 30 minutes (described as "under reduced pressure" in Table 6) and then subjected to steam curing.

The measurement of compressive strength of the cured body, and the calculation of a water absorption rate were performed in the same manner as in Example 14. The compressive strength of the cured body was more than the measurement limit (511 N/mm$^2$) of the measuring apparatus.

Example 16

A mortar and a cured body thereof were obtained in the same manner as in Example 11 except that the above-mentioned materials were kneaded in the blending amounts shown in Table 4. In manufacturing of the cured body, the compressive strength of the cured molded body during demolding was 51 N/mm$^2$.

The flow value (0-drop) of the mortar and the compressive strength of the cured body were measured in the same manner as in Example 11.

Example 17

A cured body was obtained in the same manner as in Example 16 except that the molded body after demolding was immersed into water in a desiccator under reduced pressure for 30 minutes and then subjected to steam curing.

The measurement of compressive strength of the cured body, and the calculation of a water absorption rate were performed in the same manner as in Example 14. The compressive strength of the cured body was more than the measurement limit (511 N/mm$^2$) of the measuring apparatus.

Example 18

A cured body was obtained in the same manner as in Example 13 except that the molded body after demolding was immersed into water in a desiccator under reduced pressure for 30 minutes and then subjected to steam curing.

The measurement of compressive strength of the cured body, and the calculation of a water absorption rate were performed in the same manner as in Example 14.

Example 19

The polished product of low-heat Portland cement, the silica fume B, the silica stone powder, and the fine aggregate B were loaded into an omnimixer so that each ratio of the polished product of low-heat Portland cement and the others reached the ratio shown in Table 4, and the mixture was subjected to dry kneading for 15 seconds.

Then, the water, the polycarboxylic acid-based high-range water reducing agent, and the antifoaming agent were loaded into the omnimixer in the amounts shown in Table 4, and the resultant was kneaded for 2 minutes. The antifoaming agent was added to the resultant so that the ratio of the air amount in the obtained cement composition reached 2 vol %.

After kneading, the kneaded product adhering to the side wall of the omnimixer was scraped off, and the resultant was kneaded further for 4 minutes. After that, the metal fibers in such an amount that the ratio of the metal fibers in the cement composition reached the ratio shown in Table 4 were loaded into the omnimixer, and the resultant was further kneaded for 2 minutes. A cured body was obtained in the same manner as in Example 14 except that the obtained cement composition was used as a material.

The measurement of the 0-drop flow value of the cement composition and the like were performed in the same manner as in Example 14. The compressive strength of the cured body was more than the measurement limit (511 N/mm$^2$) of the measuring apparatus.

The flexural strength of the obtained cementitious cured body was measured in accordance with "Japan Society of Civil Engineering Standard JSCE-G 552-2010 (Test method for bending strength and bending toughness of steel fiber reinforced concrete)."

Example 20

A cement composition and a cured body thereof were obtained in the same manner as in Example 19 except that the molded body after demolding was immersed into water in a desiccator under reduced pressure for 30 minutes and then subjected to steam curing, instead of being immersed into boiling water for 30 minutes.

The measurement of the flow value (0-drop) of the cement composition and the like were performed in the same manner as in Example 19. The compressive strength of the cured body was more than the measurement limit (511 N/mm$^2$) of the measuring apparatus.

Comparative Example 2

An attempt was made to load the polished product of moderate-heat Portland cement, the fine aggregate A, the high-range water reducing agent, and the water into a Hobart mixer in a lump in the blending amounts shown in Table 4 to prepare a mortar, but the materials were not able to be kneaded.

Comparative Example 3

An attempt was made to load the moderate-heat Portland cement, the silica fume A, the fine aggregate A, the high-range water reducing agent, and the water into a Hobart mixer in a lump in the blending amounts shown in Table 4 to prepare a mortar, but the materials were not able to be kneaded.

Example 21

A mortar and a cured body thereof were obtained in the same manner as in Example 11 except that low-heat Portland cement before polishing treatment was used instead of the polished product of low-heat Portland cement.

The flow value (0-drop) of the mortar and the compressive strength of the cured body were measured in the same manner as in Reference Example 1.

Example 22

A mortar and a cured body thereof were obtained in the same manner as in Example 11 except that moderate-heat Portland cement before polishing treatment was used instead of the polished product of low-heat Portland cement.

The flow value (0-drop) of the mortar and the compressive strength of the cured body were measured in the same manner as in Reference Example 1.

The results are shown in Table 6.

TABLE 4

| | Powdery raw material | | | | SF/powdery raw material (mass ratio) | Water/powdery raw material (mass ratio) | Fine aggregate/ powdery raw material (mass ratio) | Water reducing agent/powdery raw material (mass ratio) | Inorganic powder/ powdery raw material (mass ratio) | Metal fiber (vol %) |
|---|---|---|---|---|---|---|---|---|---|---|
| | Portland cement | | | | | | | | | |
| | Kind | Polishing treatment | SF[1)] | Inorganic powder | | | | | | |
| Reference Example 1 | Moderate-heat | Present | A | — | 0.12 | 0.10 | 0.31 | 0.012 | — | — |
| Reference Example 2 | Moderate-heat | Present | A | — | 0.12 | 0.09 | 0.30 | 0.020 | — | — |
| Example 11 | Low-heat | Present | B | Silica stone powder | 0.08 | 0.12 | 0.66 | 0.025 | 0.26 | — |
| Example 12 | Moderate-heat | Present | B | Silica stone powder | 0.08 | 0.12 | 0.66 | 0.025 | 0.26 | — |
| Example 13 | Moderate-heat | Present | B | Silica stone powder | 0.08 | 0.15 | 0.71 | 0.025 | 0.26 | — |
| Example 14 | Low-heat | Present | B | Silica stone powder | 0.08 | 0.12 | 0.66 | 0.025 | 0.26 | — |
| Example 15 | Low-heat | Present | B | Silica stone powder | 0.08 | 0.12 | 0.66 | 0.025 | 0.26 | — |
| Example 16 | Low-heat | Present | B | Silica stone powder | 0.16 | 0.12 | 0.66 | 0.025 | 0.18 | — |
| Example 17 | Low-heat | Present | B | Silica stone powder | 0.16 | 0.12 | 0.66 | 0.025 | 0.18 | — |
| Example 18 | Moderate-heat | Present | B | Silica stone powder | 0.08 | 0.15 | 0.71 | 0.025 | 0.26 | — |
| Example 19 | Low-heat | Present | B | Silica stone powder | 0.08 | 0.12 | 0.66 | 0.027 | 0.26 | 2 |
| Example 20 | Low-heat | Present | B | Silica stone powder | 0.08 | 0.12 | 0.66 | 0.027 | 0.26 | 2 |
| Comparative Example 2 | Moderate-heat | Present | None | — | — | 0.10 | 0.35 | 0.015 | — | — |
| Comparative Example 3 | Moderate-heat | Absent | A | — | 0.12 | 0.10 | 0.35 | 0.015 | — | — |
| Example 21 | Low-heat | Absent | B | Silica stone powder | 0.08 | 0.12 | 0.66 | 0.025 | 0.26 | — |
| Example 22 | Moderate-heat | Absent | B | Silica stone powder | 0.08 | 0.12 | 0.66 | 0.025 | 0.26 | — |

[1)]SF: silica fume

TABLE 5

| | Powdery raw material | | | | |
|---|---|---|---|---|---|
| | Portland cement | | | Silica fume | Inorganic powder (silica stone powder) (vol %) |
| | Kind | Polishing treatment | (vol %) | Kind | (vol %) | |
| Reference Example 1 | Moderate-heat | Present | 85 | A | 15 | 0 |
| Reference Example 2 | Moderate-heat | Present | 85 | A | 15 | 0 |
| Example 11 | Low-heat | Present | 60 | B | 10 | 30 |
| Example 12 | Moderate-heat | Present | 60 | B | 10 | 30 |
| Example 13 | Moderate-heat | Present | 60 | B | 10 | 30 |
| Example 14 | Low-heat | Present | 60 | B | 10 | 30 |
| Example 15 | Low-heat | Present | 60 | B | 10 | 30 |
| Example 16 | Low-heat | Present | 60 | B | 20 | 20 |
| Example 17 | Low-heat | Present | 60 | B | 20 | 20 |
| Example 18 | Moderate-heat | Present | 60 | B | 10 | 30 |
| Example 19 | Low-heat | Present | 60 | B | 10 | 30 |
| Example 20 | Low-heat | Present | 60 | B | 10 | 30 |
| Comparative Example 2 | Moderate-heat | Present | 100 | None | 0 | 0 |
| Comparative Example 3 | Moderate-heat | Absent | 85 | A | 15 | 0 |
| Example 21 | Low-heat | Absent | 60 | B | 10 | 30 |
| Example 22 | Moderate-heat | Absent | 60 | B | 10 | 30 |

TABLE 6

|  | Immersion | Water absorption rate (%) | Flow value (0-drop) (mm) | Compressive strength (N/mm²) | Flexural strength (N/mm²) |
|---|---|---|---|---|---|
| Reference Example 1 | — | — | 335 | 350 | — |
| Reference Example 2 | — | — | 270 | 290 | — |
| Example 11 | — | — | 270 | 500 | — |
| Example 12 | — | — | 270 | 420 | — |
| Example 13 | — | — | 330 | 425 | — |
| Example 14 | Boiling water | 0.50 | 270 | >511 | — |
| Example 15 | Under reduced pressure | 0.45 | 270 | >511 | — |
| Example 16 | — | — | 272 | 498 | — |
| Example 17 | Under reduced pressure | 0.44 | 272 | >511 | — |
| Example 18 | Under reduced pressure | 0.40 | 330 | 501 | — |
| Example 19 | Boiling water | 0.50 | 262 | >511 | 40 |
| Example 20 | Under reduced pressure | 0.45 | 260 | >511 | 40 |
| Comparative Example 2 | — | — | — | — | — |
| Comparative Example 3 | — | — | — | — | — |
| Example 21 | — | — | 230 | 352 | — |
| Example 22 | — | — | 225 | 351 | — |

It is understood from Examples 11 to 22 that the cement composition of the present invention has high fluidity in which the flow value (0-drop) is 225 mm or more before curing and has a high compressive strength of 351 N/mm² or more after curing.

In particular, when the case of using the polished product of cement is investigated, it is understood that, the cement compositions (Examples 11 to 20) of the present invention contain inorganic powder and hence have higher compressive strength after curing as compared to the cement compositions (Reference Examples 1 and 2) not containing inorganic powder. In particular, it is understood that, when the cured molded body is immersed into water under reduced pressure or boiling water in manufacturing of a cured body (Examples 14 and 15 and 17 to 20), the molded body after the treatment has particularly high compressive strength.

The cement compositions (Examples 19 and 20) containing metal fibers each have a compressive strength of more than 511 N/mm² and a flexural strength of 40 N/mm² after curing. Thus, it is understood that the cement compositions (Examples 19 and 20) containing metal fibers have high compressive strength and flexural strength.

It is understood from Comparative Examples 2 and 3 that, in the case that the polished product of moderate-heat Portland cement is used, but silica fume and the inorganic powder are not used (i.e. Comparative Example 2), and in the case that silica fume is used, but moderate-heat Portland cement that is not subjected to polishing treatment is used instead of the polished product of moderate-heat Portland cement and the inorganic powder is not used (i.e. Comparative Example 3), kneading cannot be performed.

REFERENCE SIGNS LIST

1 high-speed airflow stirring apparatus
2 rotor
3 blade
4 circulation circuit
4a inlet of circulation circuit
4b outlet of circulation circuit
5 loading port
6 discharge port
7 stator
8 collision chamber
9 on-off valve
10 discharge valve

The invention claimed is:

1. A method of producing a cementitious cured body made of a cement composition, the cement composition comprising:
   cement;
   silica fume having a BET specific surface area of from 10 m²/g to 25 m²/g;
   an inorganic powder having a 50% cumulative particle size of from 0.8 μm to 5 μm;
   a fine aggregate having a maximum particle size of 1.2 mm or less;
   a water reducing agent;
   an antifoaming agent; and
   water,
   wherein a ratio of the cement is from 55 vol % to 65 vol %, a ratio of the silica fume is from 5 vol % to 25 vol %, and a ratio of the inorganic powder is from 15 vol % to 35 vol % in a total amount of 100 vol % of the cement, the silica fume, and the inorganic powder,
   the method comprising:
   a molding step of setting the cement composition into a mold to provide an uncured molded body;
   a room temperature curing step of subjecting the uncured molded body to sealed curing or atmospheric curing at from 10° C. to 40° C. for 24 hours or more, followed by demolding the molded body from the mold, to thereby provide a cured molded body;
   a water absorbing step of immersing the cured molded body into boiling water at ambient pressure, and then cooling the water to 40° C. or less while keeping the cured molded body immersed in the water;
   a heat curing step of subjecting the cured molded body after being immersed in the water to steam curing or hot water curing at from 70° C. to 95° C. for 24 hours or more, to thereby provide a cured body after heat curing; and
   a high-temperature heating step of heating the cured body after the heat curing at from 150° C. to 200° C. for 24 hours or more, to thereby provide the cementitious cured body.

2. The method according to claim 1, wherein the cement is a cement which is not subjected to polishing treatment, and the BET specific surface area of the silica fume is from 15 m²/g to 25 m²/g.

3. The method according to claim 1, wherein
   the cement comprises coarse particles each having a particle size of 20 μm or more in which an angular surface portion is deformed into a rounded shape and fine particles each having a particle size of less than 20 μm; and
   the cement has a 50% weight cumulative particle size of from 10 μm to 18 μm and a Blaine specific surface area of from 2,100 cm²/g to 2,900 cm²/g.

4. The method according to claim 1, wherein the cement composition comprises one or more kinds of fibers selected from the group consisting of metal fibers, organic fibers, and carbon fibers, in which a ratio of the fibers in the cement composition is 3 vol % or less.

5. The method according to claim 1, wherein the cementitious cured body has a compressive strength after curing of 320 N/mm$^2$ or more.

6. The method according to claim 1, wherein the room temperature curing step comprises demolding the cured molded body from the mold at a time when the cured molded body exhibits a compressive strength of from 20 N/mm$^2$ to 100 N/mm$^2$.

7. The method according to claim 1, wherein
the cement comprises coarse particles each having a particle size of 20 μm or more in which an angular surface portion is deformed into a rounded shape and fine particles each having a particle size of less than 20 μm,
the cement has a 50% weight cumulative particle size of from 10 μm to 18 μm and a Blaine specific surface area of from 2,100 cm$^2$/g to 2,900 cm$^2$/g, and
the method includes a polishing step of subjecting particles of moderate-heat Portland cement or low-heat Portland cement to a polishing treatment to obtain the coarse particles and the fine particles.

* * * * *